US010970654B2

(12) United States Patent
Jenkins et al.

(10) Patent No.: US 10,970,654 B2
(45) Date of Patent: Apr. 6, 2021

(54) APPROPRIATELY DISTRIBUTING ITEMS USING AUGMENTED REALITY

(71) Applicant: International Business Machines Corporation, Armonk, NY (US)

(72) Inventors: Jana H. Jenkins, Raleigh, NC (US); Jeremy R. Fox, Georgetown, TX (US); Fang Lu, Billerica, MA (US); Uri Kartoun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 16/164,537

(22) Filed: Oct. 18, 2018

(65) Prior Publication Data

US 2020/0126004 A1   Apr. 23, 2020

(51) Int. Cl.
| | | |
|---|---|---|
| *G06Q 10/04* | (2012.01) | |
| *G06Q 10/08* | (2012.01) | |
| *G06Q 10/06* | (2012.01) | |
| *G06Q 50/28* | (2012.01) | |

(52) U.S. Cl.
CPC .......... *G06Q 10/04* (2013.01); *G06Q 10/063* (2013.01); *G06Q 10/08* (2013.01); *G06Q 10/087* (2013.01); *G06Q 50/28* (2013.01); *G06Q 10/043* (2013.01)

(58) Field of Classification Search
None
See application file for complete search history.

(56) References Cited

U.S. PATENT DOCUMENTS

| 5,313,766 A * | 5/1994 | Rimondi ............. B29C 66/1122 53/451 |
|---|---|---|
| 6,721,762 B1 | 4/2004 | Levine et al. |
| 6,894,232 B2 | 5/2005 | Waggoner et al. |
| 7,648,066 B2 | 1/2010 | Kangas et al. |
| 8,924,007 B2 * | 12/2014 | Arunapuram ........ G06Q 10/083 700/216 |
| 9,138,641 B2 | 9/2015 | Rogers et al. |
| 10,586,191 B2 * | 3/2020 | Fanourgiakis ... G06Q 10/06313 |
| 2007/0163841 A1 | 7/2007 | Hatcher et al. |

(Continued)

OTHER PUBLICATIONS

United States Department of Agriculture, "Meat and Poultry Packaging Materials," https://www.fsis.usda.gov/wps/portal/fsis/topics/food-safety-education/get-answers/food-safety-fact-sheets/safe-food-handling/packaging-materials/meat-poultry-packaging-materials, Mar. 24, 2015, pp. 1-9.

(Continued)

*Primary Examiner* — Stephanie Z Delich
(74) *Attorney, Agent, or Firm* — Robert A. Voigt, Jr.; Winstead PC (57) ABSTRACT

A method, system and computer program product for appropriately distributing items using augmented reality. After receiving a list of detected items to be placed in a container (s), an optimal placement of the detected items in the container(s) is determined. Such an optimal placement may be determined by using the dimensions and a maximum weight of items the container(s) can hold, the dimensions of the detected items, a maximum amount of weight for the container the customer can carry as well as other factors. After determining the optimal placement of the detected items in the container(s), a visual representation of such an optimal placement is displayed on an augmented reality device.

20 Claims, 5 Drawing Sheets

(56) References Cited

U.S. PATENT DOCUMENTS

| | | | |
|---|---|---|---|
| 2007/0186515 A1 | 8/2007 | Ruetten et al. | |
| 2008/0245853 A1 | 10/2008 | Patrick | |
| 2009/0090584 A1 | 4/2009 | Chakra et al. | |
| 2012/0290424 A1 | 11/2012 | Nelson et al. | |
| 2014/0067104 A1* | 3/2014 | Osterhout | G06Q 10/08 700/97 |
| 2014/0171039 A1* | 6/2014 | Bjontegard | A63F 13/65 455/414.1 |
| 2014/0172736 A1* | 6/2014 | Saha | G06Q 10/083 705/330 |
| 2016/0110975 A1* | 4/2016 | Oppenheimer | G06F 11/3438 340/572.1 |
| 2018/0374046 A1* | 12/2018 | Powers | G06Q 30/0239 |
| 2019/0272675 A1* | 9/2019 | Wagner | G06T 19/006 |

OTHER PUBLICATIONS

Glockner et al., "Augmented Reality in Logistics," http://www.dhl.com/content/dam/downloads/g0/about_us/logistics_insights/csi_augmented_reality_report_290414.pdf, 2014, pp. 1-23.

Augment, "Here's How packaging Manufacturers are Using Augmented Reality," http://www.augment.com/blog/heres-packaging-manufacturers-using-augmented-reality, May 23, 2016, pp. 1-4.

U.S. Food & Drug Administration, "Packaging & Food Contact Substances," https://www.fda.gov/Food/IngredientsPackagingLabeling/PackagingFCS/default.htm, Dec. 14, 2017, pp. 1-4.

Catherine Hurley, "Community Dialogue on Shopping Bags," Community Meeting for City of Evanston, Jun. 2014, pp. 1-30.

\* cited by examiner

APPROPRIATELY DISTRIBUTING ITEMS USING AUGMENTED REALITY

TECHNICAL FIELD

The present invention relates generally to automatically distributing items in a container using augmented reality.

BACKGROUND

Shopping, such as grocery shopping, is a part of most people's lives. Often times, a customer (also referred to as a shopper) puts the items to be purchased at the store (e.g., grocery store) in a cart (e.g., grocery cart). After the customer has completed shopping at the store, the customer purchases the items at the checkout counter (also referred to as the "point of sale" or "point of purchase").

At checkout, the cashier or a "bagger" helps put the purchased items (e.g., groceries) into containers, such as plastic or paper bags.

When packing or bagging items, it is important to ensure that certain items are not placed next to other items. For example, it is important to not pack raw meat in the same bag with other cooked food based on the general regulations for health considerations. In another example, a household cleaning product should not be placed in the same bag as with food items.

Typically, the cashier or bagger does not receive any training concerning the packing of items in a manner to comply with health regulations or considerations. As a result, items may be placed next to inappropriate items.

Furthermore, it is important to conserve natural resources, such as plastic or paper bags, used as containers for holding the purchased items. However, the cashier or bagger may not receive training concerning the packing of items in such a manner as to utilize the fewest number of containers without causing tears in the container from overweight of the items.

Hence, there is currently not a system in place that ensures that items are placed next to appropriate items in the containers and that ensures that the fewest number of containers are used to store the purchased items without causing tears in the container from overweight of the items.

SUMMARY

In one embodiment of the present invention, a method for appropriately placing items in a container comprises receiving a list of detected items that need to be placed in one or more containers. The method further comprises obtaining health information and/or present physical condition information of a customer. The method additionally comprises determining an optimal placement of the detected items in the one or more containers, where determining the optimal placement of the detected items in the one or more containers comprises the following: determining dimensions and a maximum weight of items each of the one or more containers can hold, determining dimensions of each item of the detected items, determining a maximum amount of weight for a container the customer can carry based on the obtained health information and/or present physical condition of the customer, and applying rules related to food safety to determine which detected items should not be placed in near vicinity with other detected items. Furthermore, the method comprises displaying a visual representation of the determined optimal placement of the detected items in the one or more containers on an augmented reality device.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for appropriately placing items in a container. In one embodiment of the present invention, after receiving a list of detected items to be placed in one or more containers (e.g., shopping paper bags), an optimal placement of the detected items in the container(s) is determined. Such an optimal placement may be based on determining the dimensions and a maximum weight of items such container(s) can hold. In one embodiment, a point of sale (POS) terminal determines the type(s) of container(s) to be used to store the detected items based on input received from the cashier/bagger. Based on such input, the POS terminal can determine the dimensions and amount of weight that such container(s) can hold based on information stored in a database directed to the dimensions and amount of weight containers can hold. Furthermore, the optimal placement may be based on the determined dimensions of the detected items. In one embodiment, such information may be stored in the database and obtained by the POS terminal after determining which items are to be purchased and packed in the container(s). Additionally, the optimal placement may be determined by applying rules related to food safety to determine which detected items should not be placed in near vicinity with other detected items. For example, such rules (e.g., stored in the database) may be promulgated by the United States Department of Agriculture. By applying such rules, situations, in which, an item would be placed next to an inappropriate item would be prevented. After determining the optimal placement of the detected items in the container(s), a visual representation of such an optimal placement of the detected items in the container(s) is displayed on an augmented reality device, which may be worn by the cashier/bagger to assist them in appropriately packing the items in the container(s). In this manner, the cashier/bagger can appropriately place the purchased items in the container(s) without placing items next to inappropriate items while using a minimal amount of containers without causing tears in the container from overweight of the items.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with appropriately placing items in a container, such as a grocery bag, the principles of the present invention may be applied to other types of containers than bags, such as a car space (e.g., trunk) allotted for groceries. A person of ordinary skill in the art would be capable of applying the principles of the present invention to such implementations. Further, embodiments applying the principles of the present invention to such implementations would fall within the scope of the present invention.

Figure 1:
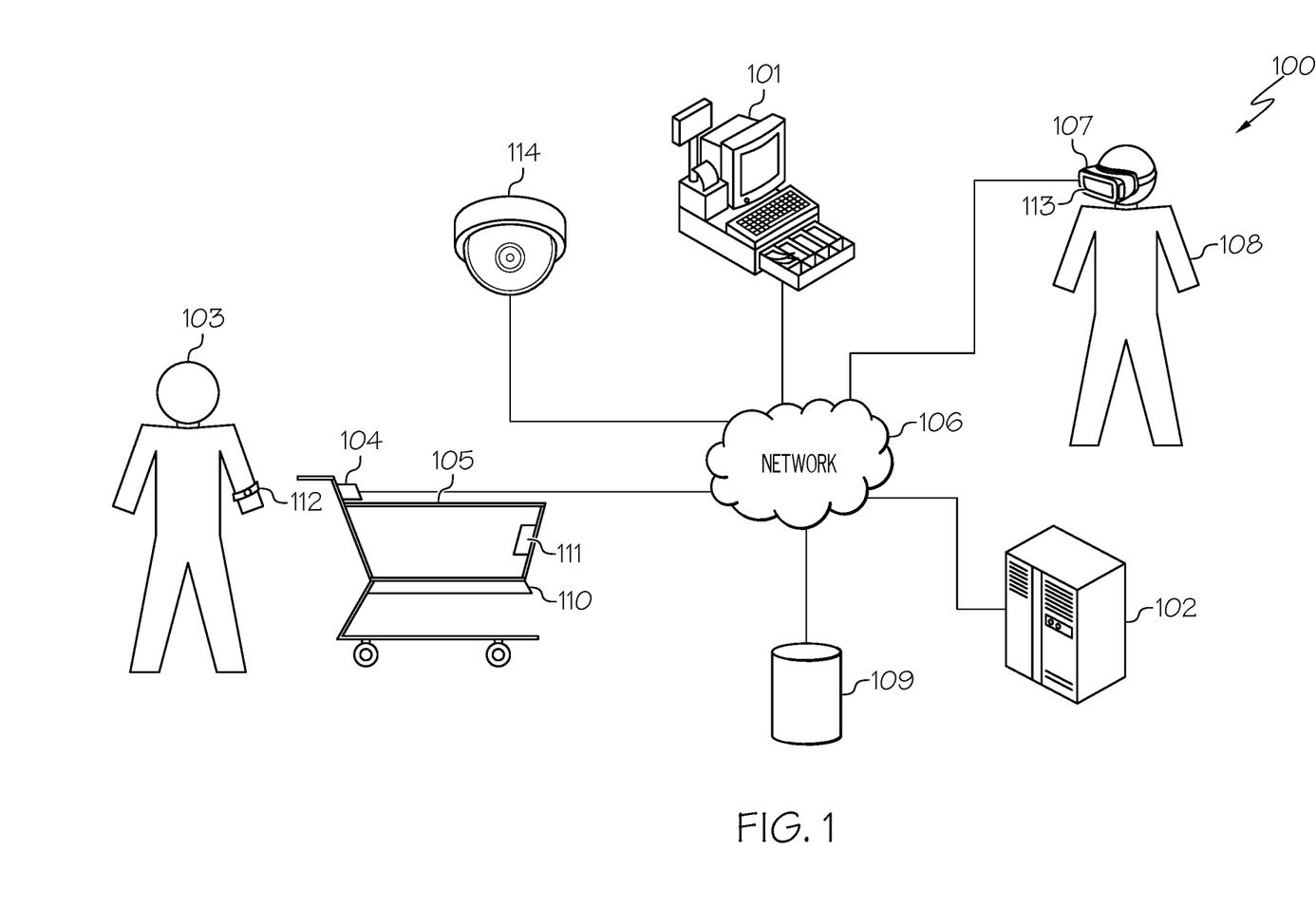
FIG. 1 illustrates a product checkout system configured in accordance with an embodiment of the present invention.

Referring now to the Figures in detail, FIG. 1 illustrates a product checkout system 100 configured in accordance with an embodiment of the present invention. System 100 is configured to appropriate place items in a container (e.g., paper bag) using augmented reality.

As shown in FIG. 1, system 100 includes a point of sale ("POS") terminal 101 which interfaces with payment cards to make electronic funds transfers. There are various types of terminals available to merchants, although most have the same basic purpose and functions. They allow a merchant to insert, swipe, or manually enter the required credit/debit card information as well as to accept near field communication (NFC) contactless transactions, and to transmit this data to the merchant service provider for authorization and finally, to transfer funds to the merchant. A description of the hardware configuration of POS terminal 101 is provided below in connection with FIG. 3.

System 100 further includes a central server 102 storing information about items to be purchased by a customer 103 (also referred to as a "shopper"), such as the item weight and item dimensions, which may be provided to server 102 by a control module 104 of a cart 105 (e.g., grocery cart). POS terminal 101 uses such information to determine an optimal placement of the items to be purchased by customer 103 in the container(s) (e.g., bags) as discussed further below. In one embodiment, POS terminal 101 is connected to central server 102 via a network 106.

Furthermore, as shown in FIG. 1, system 100 includes customer 103 to purchase items stored in cart 105 at the checkout counter. Such items will be purchased using POS terminal 101 operated by a cashier.

As discussed above, POS terminal 101 interfaces with payment cards to make electronic funds transfers. Additionally, POS terminal 101 includes an application for determining an optical placement of the items to be purchased by customer 103 in one or more containers (e.g., bags) and displaying a visual representation of the determined optimal placement of the items purchased by customer 103 in one or more container(s) on an augmented reality device 107 worn by a cashier or bagger/sacker 108, who will be placing the purchased items in the container(s) according to the visual representation. In one embodiment, the visual representation shows the optimal placement of each item in each container on augmented reality device 107.

In connection with determining the optimal placement of the items in the container(s), various factors are utilized by POS terminal 101, such as the size and amount of weight a container can hold. In one embodiment, the information pertaining to the containers (e.g., bags, such as plastic or paper bags) used by the cashier/bagger 108 to store the purchased items is stored in a database 109 connected to network 106. For example, the containers used by the cashier/bagger 108 may be pre-populated in database 109 by a user, including such information as the size and amount of weight such containers can hold. For instance, the container may correspond to a plastic bag with the dimensions of 12 (length)×7 (width)×22 (height) inches that can hold a maximum weight of 15 pounds. In another example, a paper bag with the dimensions of 17 (length)×12 (width)×18 (height) inches can hold a maximum weight of 25 pounds.

Additionally, in connection with determining the optimal placement of the items in the container(s), POS terminal 101, in one embodiment, assesses the health condition and/or a physical challenge of customer 103 to determine the amount of exertion customer 103 should exert in carrying container(s).

In one embodiment, such information may be provided to POS terminal 101 by a smart wearable 112, such as a smartwatch, worn by customer 103 (such as on the customer's wrist) via network 106. In one embodiment, smart wearable 112 is configured to monitor the user's heart rate, the user's body temperature, levels of a user's sweat, etc. Such monitored information may be transmitted to POS terminal 101, such as via network 106. Such monitored information is one of the means for monitoring the user's current health state. Such information may be used to assess the condition of customer 103 in carrying containers with a maximum amount of weight that the container can hold. For example, a high level of sweat may indicate that customer 103 is overheating and should take it easy. As a result, customer 103 may be better off carrying multiple containers, each holding a reduced amount of items and weight, in comparison to carrying fewer containers. In another example, a heart condition may be identified from the information provided by smart wearable 112 which may suggest that customer 103 may be better off carrying multiple containers, each holding a reduced amount of items and weight, in comparison to carrying fewer containers. In one embodiment, when such a condition is identified, POS terminal 101 may automatically select a certain percentage (e.g., 25%) of the maximum weight a container can hold as corresponding to the allowed weight for the container customer 103 can carry.

In another embodiment, such information may be provided to POS terminal 101 by cashier/bagger 108 based on the observation of the customer's health condition or physical challenge. For example, cashier/bagger 108 may input (such as via a keyboard) to POS terminal 101 the fact that customer 103 has a broken arm or is recovering from a physical injury (e.g., customer 103 is wearing a wrist cast). Other examples include cashier/bagger 108 observing that customer 103 is elderly or is carrying a baby, and hence, may not be able to carry heavy containers. Such information may be used to ensure that customer 103 is not provided with overly heavy containers to carry. In one embodiment, when such a condition is identified, POS terminal 101 may automatically select a certain percentage (e.g., 25%) of the maximum weight a container can hold as corresponding to the allowed weight for the container customer 103 can carry.

In another embodiment, POS terminal 101 may obtain health information about customer 103 from database 109, including information as to whether customer 103 has any conditions that would prevent customer 103 from carrying heavy weighted containers. For example, database 109 may correspond to an electronic health record database storing electronic health records of users that include information pertaining to conditions that would prevent customer 103 from carrying heavy weighted containers, such as cardiac problems, back pain, high blood pressure, pregnancy, recent surgery, etc. In one embodiment, such electronic health records can be updated from the user's physician or the user/customer themselves to specify that the user/customer cannot lift containers weighing greater than a certain weight (e.g., cannot carry containers weighing greater than 15 pounds for the next two weeks and cannot carry containers weighing greater than 20 pounds for the next three months). In this manner, POS terminal 101 can determine the maximum amount of weight for a container customer 103 can carry. In one embodiment, customer 103 previously consents to product checkout system 100 to have access to customer's electronic health records stored in database 109. In one embodiment, such consent may be provided to product checkout system 100, such as POS terminal 101, by customer 103 via a website hosted by server 102 as customer 103 is at the checkout counter. For example, customer 103 may utilize a computing device (not shown), such as a smartphone, for granting permission to product checkout system 100 to access customer's electronic health records via a website hosted by server 102, while also providing identification information to server 102 so that POS terminal 101 can access the appropriate electronic health records from database 109.

Furthermore, in one embodiment, the physical conditions of customer 103 may be obtained by POS terminal 103 via the use of camera 114 (e.g., Internet Protocol (IP) camera, such as the Mobotix v26 indoor dome camera, analog camera) connected to POS terminal 103 and server 102 via network 106. In one embodiment, camera 114 captures images of the items to be purchased by customer 103 that are placed on the checkout belt (also called the "conveyor belt"). Such images may be stored in database 109 and analyzed by POS terminal 101 or server 102 to determine which items are being purchased by customer 103 by matching pre-existing images of the items that are sold in the store, which may be stored in database 109. In the embodiment where server 102 identifies the items to be purchased by customer 103, such information is provided to POS terminal 103 via network 106.

In one embodiment, camera 114 further captures images of customer 103, such as capturing the behaviors of customer 103. For instance, behaviors, such as whether customer 103 walks slowly, having difficulty placing items on the conveyor belt, using a cane, sitting in a motorized shopping cart, carrying a baby in one arm, etc., may be captured by camera 114. In one embodiment, such images are encrypted and sent to a management center, such as the Mobotix management center (MxMC) 1.7, via network 106 and analyzed by an appropriate user(s) in real-time. Such behaviors (e.g., carrying a baby in one arm) that indicate that customer 103 may be better off carrying multiple containers may be identified and then indicated to POS terminal 101 by a user at the management center via network 106. In one embodiment, the user at the management center may provide such an indication by selecting one of the behavior options that correspond to a customer having physical limitations in carrying heavy weighted containers. In one embodiment, POS terminal 101 may automatically take into consideration such information when determining the optimal placement of the detected items in the container(s) as discussed further below. In this manner, POS terminal 101 may determine the maximum amount of weight for a container customer 103 can carry, such as automatically selecting 25% of the maximum weight a container can hold as corresponding to the allowed weight for the container customer 103 can carry in response to being notified that customer 103 is carrying a baby in one arm.

In one embodiment, POS terminal 101 determines the type(s) of container(s) used by cashier/bagger 108 based on input received from cashier/bagger 108 via a keyboard (shown in FIG. 3 discussed below).

Furthermore, in connection with determining the optimal placement of the items in the container(s), POS terminal 101 utilizes the weight of the items to be purchased by customer 103. Such information may be provided from central server 102, which obtained such information from control module 104 via a weight sensor 110 located on cart 105. Furthermore, as shown in FIG. 1, cart 105 includes a radio-frequency identification (RFID) reader 111 to identify the items placed in cart 105 as discussed further below. After identifying the items, POS terminal 101 may consider the fragility of the item in determining the appropriate placement of the item. For example, eggs are fragile, and as a result, should not be placed at the bottom of the container. In one embodiment, the fragility of items may be pre-designated by a user, where such information is stored in database 109.

In one embodiment, weight sensor 110 may be disposed in a portion of cart 105 for holding and/or carrying items for purchase. Weight sensor 110 may include a weighing scale and may be embodied by a digital scale, a strain gauge scale, and/or the like. In one embodiment, weight sensor 110 is battery powered.

In one embodiment, items for purchase may each include an RFID tag. As items are placed into or removed from cart 105, weight sensor 110 may detect a weight change. In one embodiment, RFID reader 111 scans the RFID tags on the items in cart 105 in response to the weight change to create an inventory that includes the identity of the items, the quantity of the items, and the like. Therefore, cart 105 provides a mobile scanning mechanism within cart 105 itself. Furthermore, in one embodiment, RFID reader 111 is maintained in a low-power state between item scans, extending battery life of RFID reader 111.

As discussed above, RFID reader 111, in one embodiment, scans the RFID tags of the items in cart 105. In one embodiment, scanning RFID tags includes reading, referencing, and/or obtaining electronically stored information from the RFID tags as would be known by one of ordinary skill in the art in light of the present disclosure. In another embodiment, each RFID tag includes an RF transmitter and receiver. In another embodiment, RFID reader 111 transmits a signal which is received by the RFID tag. The RFID tag responds to the RFID reader 111 with information stored in the RFID tag. In another embodiment, the range of the RFID tag is limited to approximately the area of cart 105, such that RFID reader 111 does not scan items on nearby shelves or in other carts. In another embodiment, items in a store include RFID tags. The RFID tag of each item may include an item identifier, such as a stock-keeping unit (SKU)

number, a price, an item name, any available promotions, and/or the like. In one embodiment, RFID reader 111 may be powered by an onboard battery.

The inventory may be stored at control module 104 of cart 105 and then transmitted to central server 102 via network 106 using a transmitter discussed below. Consequently, each time an item is removed or added to cart 105, the inventory may be kept current and, when customer 103 proceeds to checkout, POS terminal 101 may use the inventory to discover the identity and quantity of items in cart 105 and eliminate the need to sort through and scan items by hand.

In an alternative embodiment, POS terminal 101 discovers the identity and quantity of items in cart 105 based on cashier 108 scanning the items by hand.

As discussed above, control module 104 transmits the information pertaining to the identity and quantity of the items in cart 105 to central server 102. A description of the hardware configuration of control module 104 is provided below in connection with FIG. 2.

Figure 2:
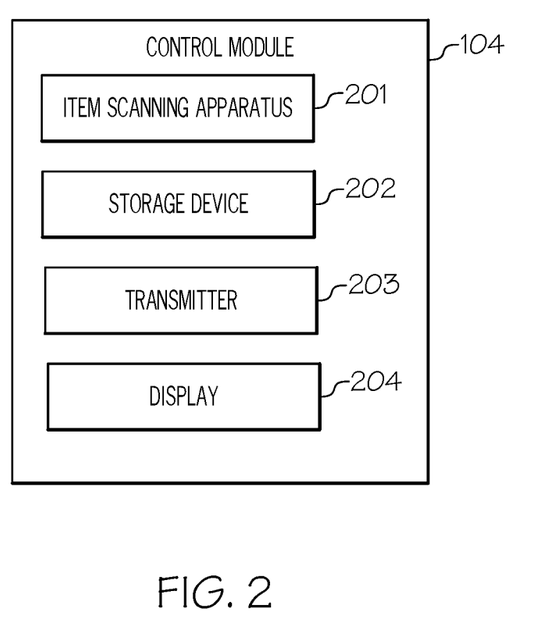
FIG. 2 illustrates an embodiment of the present invention of a hardware configuration of a control module in a cart which is representative of a hardware environment for practicing the present invention.

Referring to FIG. 2, in conjunction with FIG. 1, control module 104 includes an item scanning apparatus 201, a storage device 202, a transmitter 203, and a display 204. In one embodiment, cart 105 includes a cart for holding, carrying, storing and/or transporting items and/or merchandise. Cart 105 may be designed for use in a store, such as a grocery store, home improvement store, or other retail establishment. Cart 105 may include an integrated basket, as depicted, or may have other configurations suitable to carry items, such as, but not limited to, a flatbed dolly, a wagon, or the like. The items for placement in cart 105 may be items, goods, and/or merchandise for purchase in the store. Examples of items include, but are not limited to, groceries, home improvement goods, paper products, and the like.

In one embodiment, item scanning apparatus 201 communicates with weight sensor 110 and RFID reader 111. Item scanning apparatus 201 may use weight sensor 110 to detect a change in weight of one or more items in cart 105. Item scanning apparatus 201 may switch RFID reader 111 to an active state and trigger RFID reader 111 to scan the items in cart 105 in response to detecting the change in weight. Item scanning apparatus 201 would then be able to identify the item as well as the weight of that item (difference between current weight and former weight).

Furthermore, item scanning apparatus 201 may switch RFID reader 111 to an inactive state subsequent to RFID reader 111 scanning the items to conserve battery life of RFID reader 111. In one embodiment, item scanning apparatus 201 determines an inventory of the one or more items, including an item identity and item quantity of the items. In one embodiment, item scanning apparatus 201 stores the inventory on a storage device 202 on cart 105. Storage device 202 may include volatile memory, such as Static RAM (SRAM) or Dynamic RAM (DRAM) or non-volatile memory, such as flash memory. Storage device 202 may be in communication with item scanning apparatus 201 and disposed on shopping cart 105. The inventory, in certain embodiments, is maintained on cart 105 and transferred and/or transmitted to POS terminal 101 and/or central server 102 as part of the checkout process.

In certain embodiments, cart 105 includes a transmitter 203. In these embodiments, item scanning apparatus 201 may transmit the inventory (and weight of each item) to central server 102 or POS terminal 101 via transmitter 203. For example, item scanning apparatus 201 may transmit the inventory periodically, after each scan of RFID reader 111, or the like. In one embodiment, transmitter 203 includes a wireless local area network (WLAN) transmitter or other wireless transmitter.

In certain embodiments, cart 105 includes a display 204. Display 204 may display all or a portion of the inventory to customer 103, such as, for example, an item list, an item quantity, a cost of each item, a total cost, available promotions, and/or the like.

In one embodiment, item scanning apparatus 201 may be embodied as software, such as a software application stored on a computer readable storage medium for execution by a processor. Item scanning apparatus 201 may be embodied by hardware, such as logic hardware. In one embodiment, item scanning apparatus 201 includes a combination of hardware and software. In one embodiment, cart 105 includes a computing device for execution of item scanning apparatus 201. The computing device may include a processor and a memory that stores computer readable programs. In one embodiment, item scanning apparatus 201, RFID reader 111, storage device 202, transmitter 203, and display 204 may be separately embodied. In one embodiment, one or more of these components are integrated with one or more other components. For example, item scanning apparatus 201, RFID reader 111, storage device 202, and transmitter 203 may be integrated with display 204 (e.g., in a common housing).

Returning to FIG. 1, in connection with determining the optimal placement of the items in the container(s), POS terminal 101, in one embodiment, categorizes the items into food and non-edible products after the items that need to be placed in container(s) are detected. Furthermore, in one embodiment, POS terminal 101 categorizes the food products into different food products, such as raw meat, cooked food, vegetables, fruit and dairy products. Such categorization is performed by POS terminal 101 in order to apply rules related to food safety to determine which detected items should not be placed in near vicinity with other detected items.

Additionally, in connection with determining the optimal placement of the items in the container(s), POS terminal 101, in one embodiment, obtains the dimensions and degree of fragility of the detected items. Such information may be pre-populated in database 109, where the dimensions and degree of fragility of the items to be purchased in a store are stored in database 109. Hence, after determining which items customer 103 is purchasing, POS terminal 101 can obtain the dimensions and degree of fragility of such items from database 109 by providing a listing of such items. Alternatively, after control module 104 provides the identity and quantity of items in cart 105 to central server 102, such information may automatically be provided to POS terminal 101 along with item dimension information and degree of fragility obtained from database 109.

Furthermore, in connection with determining the optimal placement of the items in the container(s), POS terminal 101, in one embodiment, applies the rules related to food safety to determine which detected items should not be placed in near vicinity with other detected items. Such rules may be stored pre-populated in database 109. For example, such rules may be promulgated by the United States Department of Agriculture.

While FIG. 1 illustrates cashier/bagger 108 bagging the items, the principles of the present invention include the scenario of a robot packing the items in container(s), including utilizing the visual representation of the determined optimal placement of the items purchased by customer 103, which is displayed on an augment reality device 107 worn by the robot.

Furthermore, in one embodiment, in such situations where it may be deemed inadvisable for customer 103 to carry the container(s) of the items purchased, cashier/bagger 108 or a robot may load the purchased items in the vehicle of customer 103.

In another embodiment, such service may be provided for those with a physical challenge (e.g., customer with an infant), whereby the purchased items can be automatically charged to customer 103 while customer 103 is making their way to their vehicle, and thereafter, brought to the customer's vehicle.

Additionally, as discussed above, the visual representation of the determined optimal placement of the items purchased by customer 103 in one or more container(s) is displayed on an augmented reality device 107 worn by a cashier or bagger/sacker 108. In one embodiment, such an augmented reality device 107 corresponds to a headset that includes a display 113 providing a graphical environment for augmented reality (AR) generation. The graphical environment includes graphical images and/or computer-generated perceptual information. Display 113 encompasses part or all of a user's field of view.

Exemplary embodiments of headset 107 include a visor, a helmet, goggles, glasses and other similar arrangements. Examples of AR headsets 107 include the HoloLens® from Microsoft®, Magic Leap® from Lightwear®, Google® Glass Enterprise Edition, Vuzix Blade® AR as well as augmented reality headsets from HP®, Lenovo® and Dell®. Furthermore, in one embodiment, headset 107 may include any one or more of the following: headphones to provide auditory feedback, vibration means to provide vibration feedback, and other sensors placed on or around the forward facing surface when in use.

Furthermore, as shown in FIG. 1, POS terminal 101 is in communication with display 113 of headset 107 via network 106, which is capable of generating and/or controlling the graphical environment. POS terminal 101 may provide instructions to display 113, for example, by executing program code including an application program related to the AR simulation.

Network 106 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 is not to be limited in scope to any one particular architecture. System 100 may include any number of POS terminals 101, central servers 102, customers 103, control modules 104, carts 105, networks 106, augmented reality devices 107, cashiers/baggers 108, databases 109, weight sensors 110, RFID readers 111 and smart wearables 112. For example, while system 100 illustrates a single database 109, system 100 may utilize multiple databases, where each database stores particular information, such as a database directed to storing electronic health records, a database directed to storing item information, a database directed to storing container information, a database directed to storing food safety information, a database directed to storing images of items sold in the store, etc.

Figure 3:
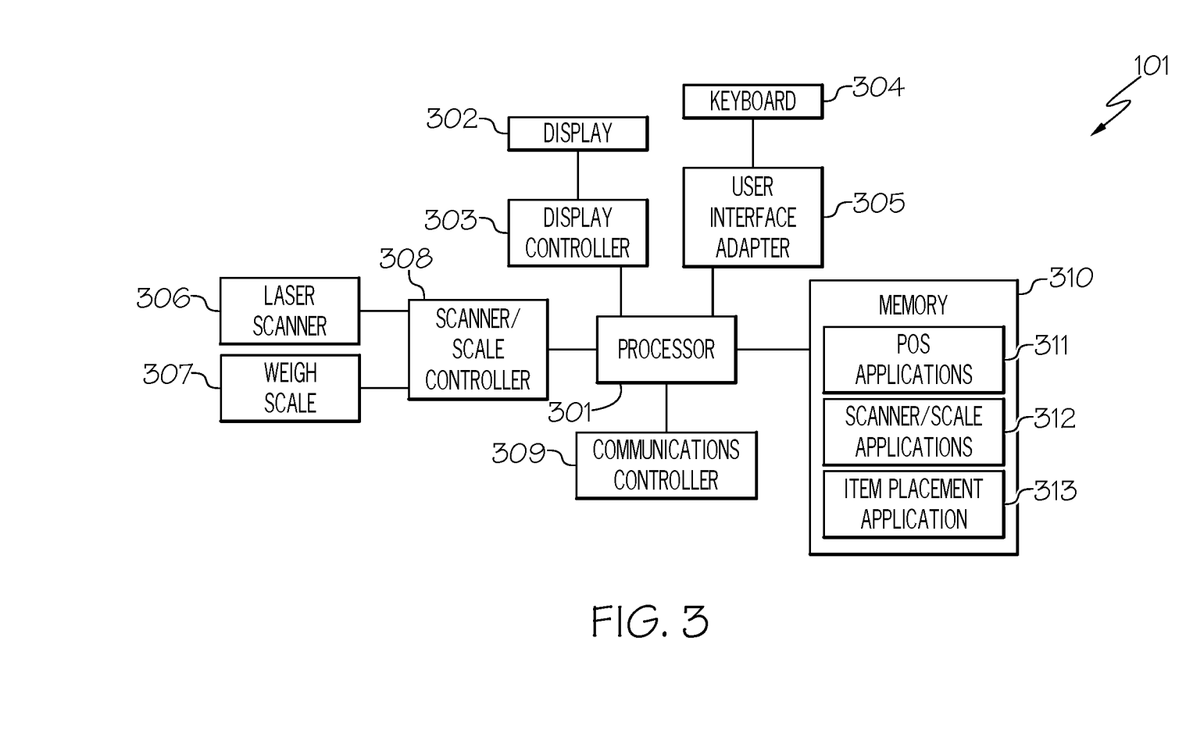
FIG. 3 illustrates an embodiment of the present invention of a hardware configuration of a point of sale (POS) terminal which is representative of a hardware environment for practicing the present invention.

Referring now to FIG. 3, FIG. 3 illustrates a hardware configuration of POS terminal 101 (FIG. 1) which is representative of a hardware environment for practicing the present invention. Referring to FIG. 3, POS terminal 101 includes a processor 301 that controls the operation of various peripheral devices. For example, processor 301 controls the operation of display 302 via a display controller 303 connected to processor 301. Additionally, processor 301 controls the operation of keyboard 304 via a user interface adapter 305 connected to processor 301. Furthermore, processor 301 controls the operation of a laser scanner 306 and a weigh scale 307 via a scanner/scale controller 308 connected to processor 301.

Additionally, POS terminal 101 includes a communications controller 309 connected to processor 301 allowing POS terminal 101 to communicate with other devices (e.g., central server 102 of FIG. 1, headset 107 of FIG. 1) via an outside network (e.g., network 106 of FIG. 1).

In one embodiment, display 302 is used to display information to a person (e.g., cashier 108) operating POS terminal 101. In one embodiment, display 302 is a liquid-crystal display (LCD) but any comparable display technology can be used.

Furthermore, as shown in FIG. 3, POS terminal 101 includes memory 310 connected to processor 301. Memory 310 is digital computer memory used to store programs and data. Processor 301 communicates with memory 310 to read program instructions and create or modify data. When software stored in memory 310 is updated, processor 301 also writes program instructions to memory 310. Memory 310 may comprise both volatile and non-volatile memory.

The program instructions are executed by processor 301 and cause processor 301 to control the operations of POS terminal 101. Some of the program instructions are organized into applications that control or generate a specific operation or function of POS terminal 101. These applications are further subdivided into POS applications 311, scanner/scale applications 312 and an item placement application 313 of the present invention, configured to appropriately place items in a container(s) by displaying a visual representation of the determined optimal placement of the items in the container(s) on an augmented reality device as discussed further below in connection with FIGS. 4-5. POS applications 311 are responsible for controlling the operations and features of POS terminal 101 including those related to a purchase transaction. Scanner/scale applications 312 are responsible for controlling the operations and features of the scanner/scale devices 306, 307.

In one embodiment, laser scanner 306 scans for optical codes, such as a bar code, affixed to items presented to POS terminal 101 for purchase. In some cases, the bar codes are printed on the items. Scanner/scale applications 312 cause processor 301 to control laser scanner 306 using scanner/scale controller 308. Scanner/scale applications 312 receive raw data from laser scanner 306 and determine if a bar code is present. The raw data includes data from a photodiode that receives reflected laser light. If a bar code is determined to be present, the bar code is decoded to recover product identification information. The product identification information is then passed to POS applications 311 to be processed as part of a purchase transaction.

In some embodiments, laser scanner 306 includes an image based scanner that scans for optical codes affixed to items presented to POS terminal 101 for purchase. An image based scanner captures a photo, using an image capture device, of an area being scanned for an optical code. The captured image is processed by processor 301 to determine if an optical code is present and if an optical code is found, it is decoded to recover product identification information. In some embodiments, laser scanner 306 includes both a laser and an image based scanner.

Furthermore, in one embodiment, scanner/scale applications 312 also cause processor 301 to control weigh scale 307 by using scanner/scale controller 308. Among other functions, scanner/scale applications 312 will receive weight information from weigh scale 307 for an item placed on the weigh scale. The weight information is then passed to POS applications 311 to be processed as part of a purchase transaction.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, shopping, such as grocery shopping, is a part of most people's lives. Often times, a customer (also referred to as a shopper) puts the items to be purchased at the store (e.g., grocery store) in a cart (e.g., grocery cart). After the customer has completed shopping at the store, the customer purchases the items at the checkout counter (also referred to as the "point of sale" or "point of purchase"). At checkout, the cashier or a "bagger" helps put the purchased items (e.g., groceries) into containers, such as plastic or paper bags. When packing or bagging items, it is important to ensure that certain items are not placed next to other items. For example, it is important to not pack raw meat in the same bag with other cooked food based on the general regulations for health considerations. In another example, a household cleaning product should not be placed in the same bag as with food items. Typically, the cashier or bagger does not receive any training concerning the packing of items in a manner to comply with health regulations or considerations. As a result, items may be placed next to inappropriate items. Furthermore, it is important to conserve natural resources, such as plastic or paper bags, used as containers for holding the purchased items. However, the cashier or bagger may not receive training concerning the packing of items in such a manner as to utilize the fewest number of containers without causing tears in the container from overweight of the items. Hence, there is currently not a system in place that ensures that items are placed next to appropriate items in the containers and that ensures that the fewest number of containers are used to store the purchased items without causing tears in the container from overweight of the items.

Figure 4:
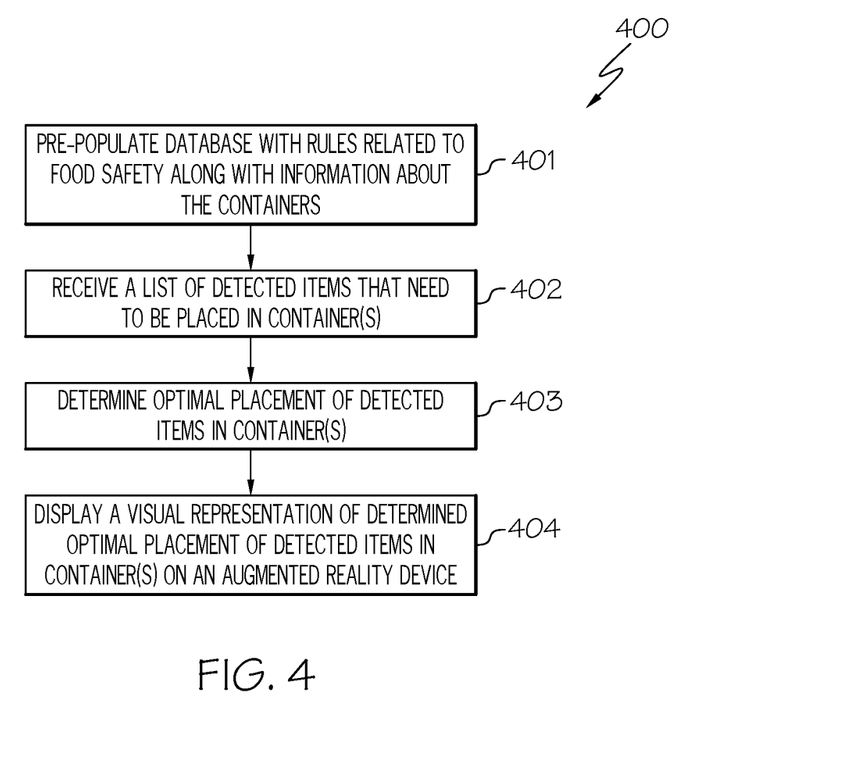
FIG. 4 is a flowchart of a method for displaying a visual representation of a determined optimal placement of the detected items in the container(s) on an augmented reality device in accordance with an embodiment of the present invention.
Figure 5:
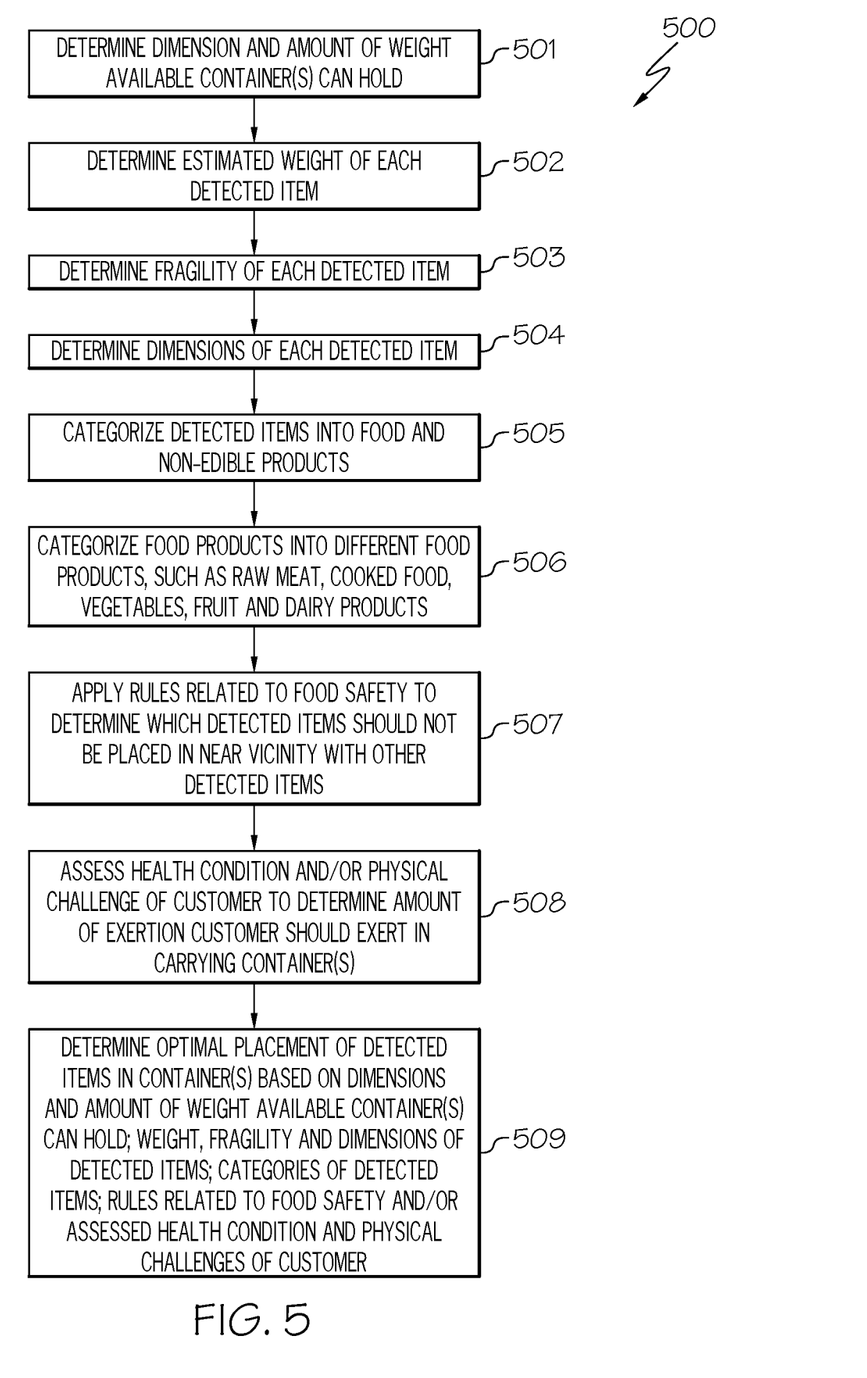
FIG. 5 is a flowchart of a method for determining the optimal placement of the detected items in the container(s) in accordance with an embodiment of the present invention.

The embodiments of the present invention provide a means for appropriately placing items in the containers and ensuring that the fewest number of containers are used to store the purchased items without causing tears in the container from overweight of the items by determining an optimal placement of the items in the containers, where a visual representation of such an optimal placement is displayed on an augmented reality device as discussed below in connection with FIGS. 4-5. FIG. 4 is a flowchart of a method for displaying a visual representation of a determined optimal placement of the detected items in the container(s) on an augmented reality device. FIG. 5 is a flowchart of a method for determining the optimal placement of the detected items in the container(s).

As stated above, FIG. 4 is a flowchart of a method 400 for displaying a visual representation of a determined optimal placement of the detected items in the container(s) on an augmented reality device in accordance with an embodiment of the present invention.

Referring to FIG. 4, in conjunction with FIGS. 1-3, in step 401, database 109 is pre-populated, such as by a user, with rules related to food safety along with information about the containers (e.g., size and amount of weight containers can hold) used by cashier/bagger 108, such as by a user.

In step 402, POS terminal 101 receives a list of items to be purchased and placed in one or more containers (e.g., shopping paper bags). Such items are referred to herein as the "detected items." As discussed above, items placed in cart 105 to be purchased by customer 103 are detected via RFID reader 111 and provided to POS terminal 101 either directly or indirectly via central server 102. Alternatively, items placed on the conveyor belt to be purchased by customer 103 may be identified via camera 114 capturing images of such items, where such images are matched against pre-existing stored images of items to be sold in the store as discussed above.

In step 403, POS terminal 101 determines the optimal placement of the detected items in the container(s). A description of determining the optimal placement of the detected items in the container(s) is provided below in connection with FIG. 5.

FIG. 5 is a flowchart of a method 500 for determining the optimal placement of the detected items in the container(s) in accordance with an embodiment of the present invention.

Referring to FIG. 5, in conjunction with FIGS. 1-4, in step 501, POS terminal 101 determines the dimensions and the amount of weight available container(s) can hold. In one embodiment, POS terminal 101 determines the type(s) of container(s) used by cashier/bagger 108 based on input received from cashier/bagger 108 via keyboard 304. Based on such input, POS terminal 101 can determine the dimensions and amount of weight that such container(s) can hold based on the pre-populated information in database 109 directed to the dimensions and amount of weight containers can hold.

In step 502, POS terminal 101 determines the estimated weight of each detected item, such as from control module 104 or central server 102. As discussed above, item scanning apparatus 201 may identify the item as well as the weight of that item, where such information may be transmitted to POS terminal 101 or central server 102.

In step 503, POS terminal 101 determines the fragility of each detected item. As discussed above, the fragility of items may be pre-designated by a user, where such information is stored in database 109. Such information may be accessed by POS terminal 101 after receiving a list of the detected items.

In step 504, POS terminal 101 further determines the dimensions of each detected item. As discussed above, in one embodiment, such information may be stored in database 109 and obtained by POS terminal 101 after determining which items are to be purchased and packed in the container(s).

In step 505, POS terminal 101 categorizes the detected items into food and non-edible products (e.g., household products, such as dish soap).

In step 506, POS terminal 101 further categorizes the food products into different food products, such as raw meat, cooked food, vegetables, fruit and dairy products.

Such a categorization is utilized to enable POS terminal 101 to appropriately place the items in a container(s) by applying rules related to food safety to determine which detected items should not be placed in near vicinity with other detected items.

In step 507, POS terminal 101 applies the rules related to food safety to determine which detected items should not be placed in near vicinity with the other detected items based on the categorization discussed above. For example, such rules (e.g., stored in database 109) may be promulgated by the United States Department of Agriculture. By applying such rules, situations in which an item would be placed next to an inappropriate item would be prevented.

In step 508, POS terminal 101 assesses the health condition and/or a physical challenge of customer 103 to determine the amount of exertion customer 103 should exert in carrying the container(s). As discussed above, in one embodiment, such health information may be provided to POS terminal 101 by a smart wearable 112, such as a smartwatch, worn by customer 103 (such as on the customer's wrist) via network 106. In one embodiment, smart wearable 112 is configured to monitor the user's heart rate, the user's body temperature, levels of a user's sweat, etc. Such monitored information may be transmitted to POS terminal 101, such as via network 106. Such monitored information is one of the means for monitoring the user's current health state. Such information may be used to assess the condition of customer 103 in carrying containers with a maximum amount of weight that the container can hold. For example, a heart condition may be identified from the information provided by smart wearable 112 which may suggest that customer 103 may be better off carrying multiple containers, each holding a reduced amount of items and weight, in comparison to carrying fewer containers. In one embodiment, when such a condition is identified, POS terminal 101 may automatically select a certain percentage (e.g., 25%) of the maximum weight a container can hold as corresponding to the allowed weight for the container customer 103 can carry.

In another embodiment, such information may be provided to POS terminal 101 by cashier/bagger 108 based on the observation of the customer's health condition or physical challenge. For example, cashier/bagger 108 may input (such as via a keyboard) to POS terminal 101 the fact that customer 103 has a broken arm or is recovering from a physical injury (e.g., customer 103 is wearing a wrist cast). Other examples include cashier/bagger 108 observing that customer 103 is elderly or is carrying a baby, and hence, may not be able to carry heavy containers. Such information may be used to ensure that customer 103 is not provided with overly heavy containers to carry. In one embodiment, when such a condition is identified, POS terminal 101 may automatically select a certain percentage (e.g., 25%) of the maximum weight a container can hold as corresponding to the allowed weight for the container customer 103 can carry.

In another embodiment, as discussed above, POS terminal 101 may obtain health information about customer 103 from database 109, including information as to whether customer 103 has any conditions that would prevent customer 103 from carrying heavy weighted containers. For example, database 109 may correspond to an electronic health record database storing health records of users that include information pertaining to conditions that would prevent customer 103 from carrying heavy weighted containers, such as cardiac problems, back pain, high blood pressure, pregnancy, recent surgery, etc. In one embodiment, such electronic health records can be updated from the user's physician or the user/customer themselves to specify that the user/customer cannot lift containers weighing greater than a certain weight (e.g., cannot carry containers weighing greater than 15 pounds for the next two weeks and cannot carry containers weighing greater than 20 pounds for the next three months). In this manner, POS terminal 101 can determine the maximum amount of weight for a container customer 103 can carry.

Furthermore, in one embodiment, the physical conditions of customer 103 may be obtained by POS terminal 103 via the use of camera 114 (e.g., Internet Protocol (IP) camera, such as the Mobotix v26 indoor dome camera, analog camera) connected to POS terminal 103 and server 102 via network 106. In one embodiment, camera 114 captures images of the items to be purchased by customer 103 that are placed on the checkout belt (also called the "conveyor belt"). Such images may be stored in database 109 and analyzed by POS terminal 101 or server 102 to determine which items are being purchased by customer 103 by matching pre-existing images of the items that are sold in the store, which may be stored in database 109. In the embodiment where server 102 identifies the items to be purchased by customer 103, such information is provided to POS terminal 103 via network 106.

In one embodiment, camera 114 further captures images of customer 103, such as capturing the behaviors of customer 103. For instance, behaviors, such as whether customer 103 walks slowly, having difficulty placing items on the conveyor belt, using a cane, sitting in a motorized shopping cart, carrying a baby in one arm, etc., may be captured by camera 114. In one embodiment, such images are encrypted and sent to a management center, such as the Mobotix management center (MxMC) 1.7, via network 106 and analyzed by an appropriate user(s) in real-time. Such behaviors (e.g., carrying a baby in one arm) that indicate that customer 103 may be better off carrying multiple containers may be identified and then indicated to POS terminal 101 by a user at the management center via network 106. In one embodiment, the user at the management center may provide such an indication by selecting one of the behavior options that correspond to a customer having physical limitations in carrying heavy weighted containers. In this manner, POS terminal 101 may determine the maximum amount of weight for a container customer 103 can carry, such as automatically selecting 25% of the maximum weight a container can hold as corresponding to the allowed weight for the container customer 103 can carry in response to being notified that customer 103 is carrying a baby in one arm.

In step 509, POS terminal 101 determines the optimal placement of the detected items in the container(s) based on the dimensions and amount of weight the available container(s) can hold; the weight, fragility and dimensions of the detected items; the categories of the detected items; the rules related to food safety and/or the assessed health condition/physical challenge of customer 103. POS terminal 101 utilizes one or more of these factors to appropriate place the items in the container(s) to ensure that the fewest number of containers are used to store the purchased items without causing tears in the container from overweight of the items as well as to ensure that items are not placed next to an inappropriate item. For example, by knowing the dimensions and amount of weight the available container(s) can hold, POS terminal 101 can determine which items should be placed in which container (as well as their position) utilizing their dimension, fragility and weight so that the fewest number of containers are used while, at the same time, ensure that containers do not tear from being overweighed with items. Furthermore, by considering fragility of the item, the present invention ensures that fragile items are not damaged by packing them underneath heavy items.

In another example, by having knowledge of the categories of the detected items, POS terminal 101 can ensure that items are not placed nest to inappropriate items, such as placing raw meat next to cooked chicken, by utilizing the rules related to food safety.

In a further example, the assessed health condition and physical condition of customer 103 is used to ensure that customer 103 carries an appropriate amount of weight in each container thereby not overly struggling to carry such purchased items.

Returning to FIG. 4, in conjunction with FIGS. 1-3 and 5, in step 404, POS terminal 101 displays a visual representation of the determined optimal placement of the detected items in the container(s) on an augmented reality device 107, such as worn by cashier/bagger 108. Cashier/bagger 108 then arranges the detected items in the container(s) according to the visual representation of the determined optimal placement of the detected items. In this manner, cashier/bagger 108 can appropriately arrange the purchased items in the container(s) without placing items next to inappropriate items while using a minimal amount of containers without causing tears in the container from overweight of the items.

In one embodiment, such a visual representation involves showing the optimal placement of each item in each container on augmented reality device 107.

While the foregoing suggests cashier/bagger 108 bagging the items by utilizing such a visual representation on an augmented reality device 107, the principles of the present invention include the scenario of a robot packing the items in container(s), including utilizing the visual representation of the determined optimal placement of the items purchased by customer 103, which is displayed on an augment reality device 107 worn by the robot. That is, the principles of the present invention include the aspect of a robot arranging the detected items in the container(s) according to the visual representation of the determined optimal placement of the detected items.

Furthermore, in one embodiment, in such situations where it may be deemed inadvisable for customer 103 to carry the container(s) of the items purchased, cashier/bagger 108 or a robot may load the purchased items in the vehicle of customer 103.

In another embodiment, such service may be provided for those with a physical challenge, whereby the purchased items can be automatically charged to customer 103 while customer 103 is making their way to their vehicle, and thereafter, brought to the customer's vehicle.

Furthermore, while the foregoing discusses POS terminal 101 determining the optimal placement of the detected items in the containers, where a visual representation of such an optimal placement is displayed on an augmented reality device, such steps as discussed above in connection with FIGS. 4-5 may be performed by server 102 as opposed to POS terminal 101. A person of ordinary skill in the art would be capable of applying the principles of the present invention to such implementations. Further, embodiments applying the principles of the present invention to such implementations would fall within the scope of the present invention.

As discussed above, embodiments of the present invention provide the means of placing items (e.g., grocery items), such as those that were purchased, into the container(s) (e.g., grocery bags) without placing them next to inappropriate items while using a minimal amount of containers without causing tears in the container from overweight of the items.

Furthermore, the present invention improves the technology or technical field involving packing items in containers. As discussed above, shopping, such as grocery shopping, is a part of most people's lives. Often times, a customer (also referred to as a shopper) puts the items to be purchased at the store (e.g., grocery store) in a cart (e.g., grocery cart). After the customer has completed shopping at the store, the customer purchases the items at the checkout counter (also referred to as the "point of sale" or "point of purchase"). At checkout, the cashier or a "bagger" helps put the purchased items (e.g., groceries) into containers, such as plastic or paper bags. When packing or bagging items, it is important to ensure that certain items are not placed next to other items. For example, it is important to not pack raw meat in the same bag with other cooked food based on the general regulations for health considerations. In another example, a household cleaning product should not be placed in the same bag as with food items. Typically, the cashier or bagger does not receive any training concerning the packing of items in a manner to comply with health regulations or considerations. As a result, items may be placed next to inappropriate items. Furthermore, it is important to conserve natural resources, such as plastic or paper bags, used as containers for holding the purchased items. However, the cashier or bagger may not receive training concerning the packing of items in such a manner as to utilize the fewest number of containers without causing tears in the container from overweight of the items. Hence, there is currently not a system in place that ensures that items are placed next to appropriate items in the containers and that ensures that the fewest number of containers are used to store the purchased items without causing tears in the container from overweight of the items.

The present invention improves such technology by placing items (e.g., grocery items) into the container(s) (e.g., grocery bags) without placing them next to inappropriate items while using a minimal amount of containers without causing tears in the container from overweight of the items. In this manner, there is an improvement in the technical field of packing items in containers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for placing items in a container, the method comprising:

receiving, by a point of sale terminal, a list of detected items that need to be placed in one or more containers, wherein said point of sale terminal interfaces with payment cards to make electronic funds transfers, wherein said list of detected items comprises items placed in a cart to be purchased by a customer that are detected via a radio-frequency identification (RFID) reader, wherein said RFID reader scans RFID tags on said items placed in said cart, wherein each of said RFID tags comprises an item identifier used to identify the item, wherein said list of detected items is maintained in a control module of said cart, wherein said list of detected items is transmitted from said control module to a server via a network, wherein said point of sale terminal accesses said list of detected items from said server via said network;

obtaining, by said point of sale terminal, health information and/or present physical condition information of said customer from a smart wearable worn by said customer, wherein said smart wearable is configured to monitor a heart rate, a body temperature and a level of sweat of said customer, wherein said smart wearable transmits said health information and/or present physical condition information of said customer to said point of sale terminal via said network;

determining, by said point of sale terminal, dimensions and a maximum amount of weight of items each of said one or more containers can hold, wherein a type of said one or more containers that are used to hold said detected items is based on input received by said point of sale terminal from a cashier or a bagger, wherein information as to said dimensions and said maximum amount of weight of items said type of said one or more containers can hold is stored in a database connected to said point of sale terminal via said network, wherein said point of sale terminal acquires said information as to said dimensions and said maximum amount of weight of items said type of said one or more containers can hold from said database in order to ensure that said detected items are placed in a fewest number of containers;

determining, by said point of sale terminal, dimensions of each item of said detected items, wherein said database is pre-populated with dimensions of items to be purchased in a store, wherein said point of sale terminal obtains said dimensions of each item of said detected items which are identified by said item identifiers from said database, wherein said dimensions of each item of said detected items are used to ensure that a number of items that are placed in a first container does not exceed a dimension of said first container using said determined dimensions of said one or more containers so as to ensure that said detected items are placed in a fewest number of containers;

determining, by said point of sale terminal, an estimated weight of each item of said detected items, wherein said estimated weight of each item of said detected items is obtained via a weight sensor located on said cart, wherein said weight sensor comprises a weighing scale;

determining, by said point of sale terminal, a maximum amount of weight for said first container said customer can carry based on said obtained health information and/or present physical condition of said customer, wherein a condition is identified from said health information and/or present physical condition information of said customer provided by said smart wearable worn by said customer, wherein in response to identifying said condition, a percentage of a maximum weight said first container can hold corresponds to said determined maximum amount of weight for said first container said customer can carry;

applying, by said point of sale terminal, rules related to food safety to determine which detected items should not be placed in vicinity with other detected items, wherein said rules are pre-populated in said database accessible by said point of sale terminal, wherein said rules ensure that certain items are not placed in said first container next to one another in order to ensure food safety; and displaying, by said point of sale terminal, a visual representation of a placement of said detected items in said one or more containers on an augmented reality device so that said detected items are placed in said one or more containers in a fewest number of containers;

wherein a robot arranges said detected items in said one or more containers according to said visual representation of said placement of said detected items.

2. The method as recited in claim 1 further comprising:
determining a fragility of each item of said detected items, wherein a degree of said fragility of each item of said detected items is pre-populated in said database.

3. The method as recited in claim 1, wherein said customer's health information is obtained via an electronic health record of said customer, wherein said electronic health record comprises information pertaining to conditions that would prevent said customer from carrying containers exceeding a weight, wherein said conditions comprise cardiac problems, back pain, high blood pressure and recent surgery, wherein said electronic health record specifies that said customer cannot carry a container weighing greater than said weight.

4. The method as recited in claim 1, wherein said customer's present physical condition information is obtained via a camera connected to said point of sale terminal, wherein images of said customer are captured by said camera, wherein said images are encrypted and sent to a management center by said point of sale terminal via said network, wherein said customer's present physical condition is identified by a user at said management center which is sent to said point of sale terminal via said network.

5. The method as recited in claim 1 further comprising:
categorizing said detected items into food and non-edible products, wherein said categorization is performed by said point of sale terminal in order to apply said rules related to said food safety to determine which detected items should not be placed in vicinity with other detected items.

6. The method as recited in claim 5 further comprising:
categorizing said food products into different categories of food products, wherein said different categories of food products comprise one or more of the following: raw meat, cooked food, vegetables, fruit and dairy products.

7. The method as recited in claim 1, wherein said RFID reader scans said RFID tags on said items placed in said cart in response to a weight change detected by said weight sensor.

8. A computer program product for placing items in a container, the computer program product comprising a computer readable storage medium having program code embodied therewith, the program code comprising the programming instructions for:
receiving, by a point of sale terminal, a list of detected items that need to be placed in one or more containers, wherein said point of sale terminal interfaces with payment cards to make electronic funds transfers, wherein said list of detected items comprises items placed in a cart to be purchased by a customer that are detected via a radio-frequency identification (RFID) reader, wherein said RFID reader scans RFID tags on said items placed in said cart, wherein each of said RFID tags comprises an item identifier used to identify the item, wherein said list of detected items is maintained in a control module of said cart, wherein said list of detected items is transmitted from said control module to a server via a network, wherein said point of sale terminal accesses said list of detected items from said server via said network;

obtaining, by said point of sale terminal, health information and/or present physical condition information of said customer from a smart wearable worn by said customer, wherein said smart wearable is configured to monitor a heart rate, a body temperature and a level of sweat of said customer, wherein said smart wearable transmits said health information and/or present physical condition information of said customer to said point of sale terminal via said network;

determining, by said point of sale terminal, dimensions and a maximum amount of weight of items each of said one or more containers can hold, wherein a type of said one or more containers that are used to hold said detected items is based on input received by said point of sale terminal from a cashier or a bagger, wherein information as to said dimensions and said maximum amount of weight of items said type of said one or more containers can hold is stored in a database connected to said point of sale terminal via said network, wherein said point of sale terminal acquires said information as to said dimensions and said maximum amount of weight of items said type of said one or more containers can hold from said database in order to ensure that said detected items are placed in a fewest number of containers;

determining, by said point of sale terminal, dimensions of each item of said detected items, wherein said database is pre-populated with dimensions of items to be purchased in a store, wherein said point of sale terminal obtains said dimensions of each item of said detected items which are identified by said item identifiers from said database, wherein said dimensions of each item of said detected items are used to ensure that a number of items that are placed in a first container does not exceed a dimension of said first container using said determined dimensions of said one or more containers so as to ensure that said detected items are placed in a fewest number of containers;

determining, by said point of sale terminal, an estimated weight of each item of said detected items, wherein said estimated weight of each item of said detected items is obtained via a weight sensor located on said cart, wherein said weight sensor comprises a weighing scale;

determining, by said point of sale terminal, a maximum amount of weight for said first container said customer can carry based on said obtained health information and/or present physical condition of said customer, wherein a condition is identified from said health information and/or present physical condition information of said customer provided by said smart wearable worn by said customer, wherein in response to identifying said condition, a percentage of a maximum weight said first container can hold corresponds to said determined maximum amount of weight for said first container said customer can carry;

applying, by said point of sale terminal, rules related to food safety to determine which detected items should not be placed in vicinity with other detected items, wherein said rules are pre-populated in said database accessible by said point of sale terminal, wherein said rules ensure that certain items are not placed in said first container next to one another in order to ensure food safety; and displaying, by said point of sale terminal, a visual representation of a placement of said detected items in said one or more containers on an augmented reality device so that said detected items are placed in said one or more containers in a fewest number of containers;

wherein a robot arranges said detected items in said one or more containers according to said visual representation of said placement of said detected items.

9. The computer program product as recited in claim 8, wherein the program code further comprises the programming instructions for:
determining a fragility of each item of said detected items, wherein a degree of said fragility of each item of said detected items is pre-populated in said database.

10. The computer program product as recited in claim 8, wherein said customer's health information is obtained via an electronic health record of said customer, wherein said electronic health record comprises information pertaining to conditions that would prevent said customer from carrying containers exceeding a weight, wherein said conditions comprise cardiac problems, back pain, high blood pressure and recent surgery, wherein said electronic health record specifies that said customer cannot carry a container weighing greater than said weight.

11. The computer program product as recited in claim 8, wherein said customer's present physical condition information is obtained via a camera connected to said point of sale terminal, wherein images of said customer are captured by said camera, wherein said images are encrypted and sent to a management center by said point of sale terminal via said network, wherein said customer's present physical condition is identified by a user at said management center which is sent to said point of sale terminal via said network.

12. The computer program product as recited in claim 8, wherein the program code further comprises the programming instructions for:
categorizing said detected items into food and non-edible products, wherein said categorization is performed by said point of sale terminal in order to apply said rules related to said food safety to determine which detected items should not be placed in vicinity with other detected items.

13. The computer program product as recited in claim 12, wherein the program code further comprises the programming instructions for:
categorizing said food products into different categories of food products, wherein said different categories of food products comprise one or more of the following: raw meat, cooked food, vegetables, fruit and dairy products.

14. The computer program product as recited in claim 8, wherein said RFID reader scans said RFID tags on said items placed in said cart in response to a weight change detected by said weight sensor.

15. A point of sale terminal, comprising:
a memory for storing a computer program for placing items in a container; and
a processor connected to said memory, wherein said processor is configured to execute the program instructions of the computer program comprising:
receiving a list of detected items that need to be placed in one or more containers, wherein said point of sale terminal interfaces with payment cards to make electronic funds transfers, wherein said list of detected items comprises items placed in a cart to be purchased by a customer that are detected via a radio-frequency identification (RFID) reader, wherein said RFID reader scans RFID tags on said items placed in said cart, wherein each of said RFID tags comprises an item identifier used to identify the item, wherein said list of detected items is maintained in a control module of said cart, wherein said list of detected items is transmitted from said control module to a server via a network, wherein said point of sale terminal accesses said list of detected items from said server via said network;
obtaining health information and/or present physical condition information of said customer from a smart wearable worn by said customer, wherein said smart wearable is configured to monitor a heart rate, a body temperature and a level of sweat of said customer, wherein said smart wearable transmits said health information and/or present physical condition information of said customer to said point of sale terminal via said network;
determining dimensions and a maximum amount of weight of items each of said one or more containers can hold, wherein a type of said one or more containers that are used to hold said detected items is based on input received by said point of sale terminal from a cashier or a bagger, wherein information as to said dimensions and said maximum amount of weight of items said type of said one or more containers can hold is stored in a database connected to said point of sale terminal via said network, wherein said point of sale terminal acquires said information as to said dimensions and said maximum amount of weight of items said type of said one or more containers can hold from said database in order to ensure that said detected items are placed in a fewest number of containers;

determining dimensions of each item of said detected items, wherein said database is pre-populated with dimensions of items to be purchased in a store, wherein said point of sale terminal obtains said dimensions of each item of said detected items which are identified by said item identifiers from said database, wherein said dimensions of each item of said detected items are used to ensure that a number of items that are placed in a first container does not exceed a dimension of said first container using said determined dimensions of said one or more containers so as to ensure that said detected items are placed in a fewest number of containers;

determining an estimated weight of each item of said detected items, wherein said estimated weight of each item of said detected items is obtained via a weight sensor located on said cart, wherein said weight sensor comprises a weighing scale;

determining a maximum amount of weight for said first container said customer can carry based on said obtained health information and/or present physical condition of said customer, wherein a condition is identified from said health information and/or present physical condition information of said customer provided by said smart wearable worn by said customer, wherein in response to identifying said condition, a percentage of a maximum weight said first container can hold corresponds to said determined maximum amount of weight for said first container said customer can carry;

applying rules related to food safety to determine which detected items should not be placed in vicinity with other detected items, wherein said rules are pre-populated in said database accessible by said point of sale terminal, wherein said rules ensure that certain items are not placed in said first container next to one another in order to ensure food safety; and displaying a visual representation of a placement of said detected items in said one or more containers on an augmented reality device so that said detected items are placed in said one or more containers in a fewest number of containers;

wherein a robot arranges said detected items in said one or more containers according to said visual representation of said placement of said detected items.

16. The system as recited in claim 15, wherein the program instructions of the computer program further comprise:
determining a fragility of each item of said detected items, wherein a degree of said fragility of each item of said detected items is pre-populated in said database.

17. The system as recited in claim 15, wherein said customer's health information is obtained via an electronic health record of said customer, wherein said electronic health record comprises information pertaining to conditions that would prevent said customer from carrying containers exceeding a weight, wherein said conditions comprise cardiac problems, back pain, high blood pressure and recent surgery, wherein said electronic health record specifies that said customer cannot carry a container weighing greater than said weight.

18. The system as recited in claim 15, wherein said customer's present physical condition information is obtained via a camera connected to said point of sale terminal, wherein images of said customer are captured by said camera, wherein said images are encrypted and sent to a management center by said point of sale terminal via said network.

19. The system as recited in claim 15, wherein the program instructions of the computer program further comprise:
categorizing said detected items into food and non-edible products, wherein said categorization is performed by said point of sale terminal in order to apply said rules related to said food safety to determine which detected items should not be placed in vicinity with other detected items.

20. The system as recited in claim 19, wherein the program instructions of the computer program further comprise:
categorizing said food products into different categories of food products, wherein said different categories of food products comprise one or more of the following: raw meat, cooked food, vegetables, fruit and dairy products.

* * * * *